(12) United States Patent
Kohlmeier et al.

(10) Patent No.: US 10,528,597 B2
(45) Date of Patent: Jan. 7, 2020

(54) GRAPH-DRIVEN AUTHORING IN PRODUCTIVITY TOOLS

(71) Applicant: Microsoft Technology Licensing, LLC, Redmond, WA (US)

(72) Inventors: Bernhard S. J. Kohlmeier, Seattle, WA (US); Pradeep Chilakamarri, Seattle, WA (US); Bjørn Olstad, Oslo (NO); Ashok Kuppusamy, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 300 days.

(21) Appl. No.: 14/729,644

(22) Filed: Jun. 3, 2015

(65) Prior Publication Data

US 2016/0357842 A1 Dec. 8, 2016
US 2017/0364575 A9 Dec. 21, 2017

Related U.S. Application Data

(63) Continuation-in-part of application No. 14/499,195, filed on Sep. 28, 2014, now Pat. No. 10,210,146.

(51) Int. Cl.
| | | |
|---|---|---|
| *G06F 16/28* | (2019.01) | |
| *G06F 16/2457* | (2019.01) | |
| *G06F 16/2458* | (2019.01) | |
| *G06F 17/21* | (2006.01) | |
| *G06Q 10/10* | (2012.01) | |

(52) U.S. Cl.
CPC ........ *G06F 16/285* (2019.01); *G06F 16/2477* (2019.01); *G06F 16/24575* (2019.01); *G06F 16/24578* (2019.01); *G06F 17/212* (2013.01); *G06Q 10/10* (2013.01)

(58) Field of Classification Search
CPC ................................................. G06F 17/30598
See application file for complete search history.

(56) References Cited

U.S. PATENT DOCUMENTS

| | | | |
|---|---|---|---|
| 5,724,595 A | 3/1998 | Gentner | |
| 6,112,203 A | 8/2000 | Bharat et al. | |

(Continued)

FOREIGN PATENT DOCUMENTS

| | | |
|---|---|---|
| CN | 101124609 A | 2/2008 |
| CN | 102171685 A | 8/2011 |

(Continued)

OTHER PUBLICATIONS

"SecondWritten Opinion Issued in PCT Application No. PCT/US2016/035364", dated Jan. 25, 2017, 6 Pages.

(Continued)

*Primary Examiner* — James Trujillo
*Assistant Examiner* — John J Morris
(74) *Attorney, Agent, or Firm* — Talem IP Law, LLP

(57) ABSTRACT

Systems and techniques for graph-driven authoring in productivity applications can include using context of a user of a productivity application, the existing content of the user's document or an expression input with a command for finding relevant documents, and a date/time to obtain a set of results of relevant documents. The relevant documents include documents associated with people known to the user that contain content relevant to the topic(s) and/or entities from the context and that are current.

20 Claims, 11 Drawing Sheets

(56) References Cited

U.S. PATENT DOCUMENTS

| | | |
|---|---|---|
| 6,219,679 B1 | 4/2001 | Brisebois et al. |
| 6,421,675 B1 | 7/2002 | Ryan et al. |
| 6,480,837 B1 | 11/2002 | Dutta |
| 6,675,159 B1 | 1/2004 | Lin et al. |
| 6,912,694 B1 | 6/2005 | Harrison et al. |
| 7,080,076 B1 | 7/2006 | Williamson et al. |
| 7,213,198 B1 | 5/2007 | Harik |
| 7,756,850 B2 | 7/2010 | Keith, Jr. |
| 7,831,601 B2 | 11/2010 | Oral et al. |
| 7,984,035 B2 | 7/2011 | Levin et al. |
| 8,046,387 B2 | 10/2011 | Nelson |
| 8,121,902 B1 | 2/2012 | Desjardins et al. |
| 8,352,397 B2 | 1/2013 | Rubin et al. |
| 8,380,723 B2 | 2/2013 | Radlinski et al. |
| 8,452,769 B2 | 5/2013 | Altaf et al. |
| 8,479,094 B2 | 7/2013 | Fouts |
| 8,560,485 B2 | 10/2013 | Labrou et al. |
| 8,583,673 B2 | 11/2013 | Tarek et al. |
| 8,676,815 B2 | 3/2014 | Deng et al. |
| 9,053,190 B1 | 6/2015 | Boenau et al. |
| 9,213,470 B2 | 12/2015 | Yoshida |
| 9,792,015 B2 | 10/2017 | Baer et al. |
| 2004/0093559 A1 | 5/2004 | Amaru et al. |
| 2005/0091578 A1 | 4/2005 | Madan et al. |
| 2005/0154760 A1 | 7/2005 | Bhakta et al. |
| 2006/0004892 A1* | 1/2006 | Lunt ............... G06F 17/30864 |
| 2006/0026013 A1 | 2/2006 | Kraft |
| 2006/0085469 A1 | 4/2006 | Pfeiffer et al. |
| 2006/0184512 A1 | 8/2006 | Kohanim et al. |
| 2008/0071803 A1 | 3/2008 | Boucher |
| 2008/0104061 A1 | 5/2008 | Rezaei |
| 2008/0229244 A1 | 9/2008 | Markus et al. |
| 2008/0281793 A1 | 11/2008 | Mathur |
| 2009/0300547 A1 | 12/2009 | Bates et al. |
| 2009/0327264 A1 | 12/2009 | Yu et al. |
| 2010/0077290 A1 | 3/2010 | Pueyo |
| 2010/0082570 A1 | 4/2010 | Altaf et al. |
| 2010/0082610 A1 | 4/2010 | Anick et al. |
| 2010/0088376 A1 | 4/2010 | Kunz et al. |
| 2010/0125781 A1 | 5/2010 | Gadacz |
| 2010/0325535 A1 | 12/2010 | Reddy |
| 2011/0026901 A1 | 2/2011 | Kashima |
| 2011/0078615 A1 | 3/2011 | Bier |
| 2011/0083167 A1 | 4/2011 | Carpenter et al. |
| 2011/0087661 A1* | 4/2011 | Quick ............... G06F 17/30554 707/732 |
| 2011/0093459 A1* | 4/2011 | Dong ............... G06F 17/30867 707/725 |
| 2011/0099464 A1 | 4/2011 | Marashi et al. |
| 2011/0107194 A1 | 5/2011 | Cui |
| 2011/0119248 A1 | 5/2011 | Abe et al. |
| 2011/0238650 A1 | 9/2011 | Jenkins et al. |
| 2011/0252060 A1 | 10/2011 | Broman et al. |
| 2012/0136887 A1 | 5/2012 | Cha et al. |
| 2012/0151310 A1 | 6/2012 | El-kalliny |
| 2012/0191716 A1 | 7/2012 | Omoigui |
| 2012/0198381 A1 | 8/2012 | Kumamoto |
| 2012/0265767 A1* | 10/2012 | Brdiczka ............ G06F 17/2785 707/748 |
| 2012/0284245 A1 | 11/2012 | Portnoy et al. |
| 2012/0317109 A1* | 12/2012 | Richter ............ G06F 17/30867 707/734 |
| 2013/0036348 A1 | 2/2013 | Hazard |
| 2013/0086526 A1 | 4/2013 | Nowakowski et al. |
| 2014/0081904 A1* | 3/2014 | Sitrick ............... G06F 17/212 707/608 |
| 2014/0136468 A1 | 5/2014 | Faratin et al. |
| 2014/0136506 A1 | 5/2014 | Ratner et al. |
| 2014/0164890 A1 | 6/2014 | Fox et al. |
| 2014/0173426 A1 | 6/2014 | Huang et al. |
| 2014/0176607 A1 | 6/2014 | Yang et al. |
| 2014/0188925 A1 | 7/2014 | Skolicki |
| 2014/0281850 A1 | 9/2014 | Prakash et al. |
| 2014/0289597 A1 | 9/2014 | Kim |
| 2015/0100562 A1 | 4/2015 | Kohlmeier et al. |
| 2015/0120700 A1 | 4/2015 | Holm et al. |
| 2016/0188143 A1 | 6/2016 | Kohlmeier et al. |

FOREIGN PATENT DOCUMENTS

| | | |
|---|---|---|
| CN | 103797481 A | 5/2014 |
| WO | 2013040761 A1 | 3/2013 |

OTHER PUBLICATIONS

"International Preliminary Report on Patentability Issued in PCT Application No. PCT/US2016/035364", dated Apr. 25, 2017, 07 Pages.

"Demand for International Preliminary Examination under Chapter II PCT Application No. PCT/US2016/035364," Date Filed: Aug. 31, 2016, 10 Pages.

Bosnic, et al., "Automatic Keywords Extraction—a Basis for Content Recommendation", In Proceedings of the Fourth International Workshop on Search and Exchange of E-learning Materials; Sep. 27, 2010; 10 pages.

U.S. Appl. No. 14/499,195, Bernhard S.J. Kohlmeier, et al., "Productivity Tools for Content Authoring ", filed Sep. 28, 2014.

"Document collaboration and Co-Authoring", Retrieved on: Mar. 13, 2015 Available at: https://support.office.com/en-gb/article/Document-collaboration-and-co-authoring-ee1509b4-1f6e-401e-b04a-782d26f564a4?ui=en-US&rs=en-GB&ad=GB.

"Enterprise Content Creation", Retrieved on: Mar. 15, 2015 Available at: http://www.objective.com/products/enterprise-content-creation/collaborative-authoring.

"International Search Report and Written Opinion Issued in PCT Application No. PCT/US2016/035364", dated Jul. 27, 2016, 11 Pages.

"Britannica Researcher", Retrieved from: https://web.archive.org/web/20130106191050/http://office.microsoft.com:80/en-us/store/britannica-researcher-WA102924944.aspx, Retrieved Date: Jan. 6, 2013, 2 Pages.

"Encyclopedia Definition", Retrieved from https://web.archive.org/web/20131028173256/http://www.merriam-webster.com/dictionary/encyclopedia, Oct. 28, 2013, 3 Pages.

"Reference Manager", Retrieved from: https://web.archive.org/web/20111227034641/http://www.refman.com/rmwhatsnew.asp, Dec. 2010, 2 Pages.

"Final Office Action Issued in U.S. Appl. No. 14/499,195", dated Dec. 23, 2016, 17 Pages.

"Final Office Action Issued in U.S. Appl. No. 14/499,195", dated Dec. 7, 2017, 18 Pages.

"Non Final Office Action Issued in U.S. Appl. No. 14/499,195", dated May 11, 2017, 17 Pages.

"Non Final Office Action Issued in U.S. Appl. No. 14/499,195", dated Jun. 7, 2016, 18 Pages.

"Non-Final Office Action Issued in U.S. Appl. No. 14/499,195", dated May 14, 2018, 19 Pages.

"Final Office Action Issued in U.S. Appl. No. 14/738,091", dated Mar. 7, 2018, 29 Pages.

"Non Final Rejection Issued in U.S. Appl. No. 14/738,091", dated Sep. 11, 2017, 26 Pages.

Boubas, et al., "Social Content Authoring with No Social Traps", In International Conference on Collaboration Technologies and Systems (CTS), May 20, 2013, 4 Pages.

Crystal, Abe, "Interface Design for Metadata Creation", In Proceedings of the Extended Abstracts on Human Factors in Computing Systems, Apr. 5, 2003, 2 Pages.

Li, et al., "Online Web-Video Topic Detection and Tracking with Semi-supervised Learning", In Proceedings of the 14th Pacific-Rim Conference on Advances in Multimedia Information Processing—PCM 2013—vol. 8294, Dec. 13, 2013, pp. 750-759.

Melville, et al., "Content-Boosted Collaborative Filtering for Improved Recommendations", In Proceedings of the Eighteenth National Conference on Artificial Intelligence, Jul. 28, 2002, 6 Pages.

(56) References Cited

OTHER PUBLICATIONS

Middleton, et al., "Exploiting Synergy Between Ontologies and Recommender Systems", In Proceedings of International Workshop on the Semantic Web Conference, Apr. 8, 2002, 10 Pages.
Oral, et al., "Dealing with the Cold Start Problem when Providing Personalized Enterprise Content Recommendations", Retrieved from: https://pdfs.semanticscholar.org/d134/2948d571da7e9f29135c7404df65e4cef861.pdf, Retrieved Date: Dec. 11, 2013, 4 Pages.
Paris, et al., "Capturing the user's Reading Context for Tailoring Summaries", In Proceedings of 17th International conference User Modeling, Adaptation, and Personalization, Jun. 22, 2009, 6 Pages.
"International Preliminary Report on Patentability Issued in PCT Patent Application No. PCT/US2015/052534", dated Dec. 13, 2016, 6 Pages.
"International Search Report and Written Opinion in PCT Application No. PCT/US2015/052534", dated Jan. 4, 2016, 10 Pages.
"Second Written Opinion Issued in PCT Application No. PCT/US2015/052534", dated Aug. 11, 2016, 5 Pages.
"International Preliminary Report on Patentability Issued in PCT Application No. PCT/US2015/052653", dated May 9, 2017, 6 Pages.
"International Search Report & Written Opinion Issued in PCT Application No. PCT/US2015/052653", dated Dec. 23, 2015, 11 Pages.
"Second Written Opinion Issued in PCT Application No. PCT/US2015/052653", dated Mar. 10, 2017, 5 Pages.
Weng, et al., "Exploiting Item Taxonomy for Solving Cold-start Problem in Recommendation Making", In 20th IEEE International Conference on Tools with Artificial Intelligence, vol. 2, Nov. 3, 2008, 8 Pages.
"Notice of Allowance Issued in U.S. Appl. No. 14/499,195", dated Oct. 4, 2018, 13 Pages.
"Non Final Office Action Issued in U.S. Appl. No. 14/738,091", dated Oct. 2, 2018, 29 Pages.
"First Office Action and Search Report Issued in Chinese Patent Application No. 201580052493.6", dated Sep. 16, 2019, 19 Pages.

* cited by examiner

GRAPH-DRIVEN AUTHORING IN PRODUCTIVITY TOOLS

BACKGROUND

Productivity applications can include a variety of tools and information that facilitate the accomplishment of a variety of tasks related to producing content, including creating and editing content within different types of documents such as word processing documents, spreadsheets, and presentations. In some cases, productivity applications can be considered to be, or to include, content authoring applications.

While creating and editing content within a productivity application, a user may start with a blank page, information "borrowed" from other sources, or from an existing document. Finding relevant information from online, remote, or local sources can be a challenge.

BRIEF SUMMARY

Techniques and systems for facilitating content authoring are presented. Content from previously prepared documents can be easily reused and incorporated into a user's document to initiate, supplement, and/or enhance the creation process.

Documents that are relevant to a topic for a user's document, that were prepared or modified by the user or a related user, and that are determined to be current can be provided to the user of a productivity application for possible reuse in the user's document.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 1A illustrates an example company hierarchy and FIG. 1B illustrates a representative graph data structure based on the example hierarchy that may be used to drive authoring in productivity tools.

DETAILED DESCRIPTION

Techniques and systems for facilitating content authoring are presented. Content from previously prepared documents can be easily reused and incorporated into a user's document to initiate, supplement, and/or enhance the creation process. It can be difficult to recall documents that may be relevant to a content authoring task (e.g., the purpose for using a productivity application) because a user may not be aware of or remember if relevant content has been previously prepared by that user or another user (whose content the original user has access).

Graph-driven authoring in a productivity application can provide assistance for a user of the productivity application with finding relevant information as well as handling the "cold start" scenario, where there is insufficient information for a system to use to draw inferences for providing a recommendation of content to a user.

In the context of the graph-driven authoring, the relationship between authors of content provides a primary indicator of relevance. For example, if someone who is a peer, a student in the same class, or a colleague in the user's organization authored content, this content would be considered to have a higher likelihood of being relevant to the user's own work. Relevant documents are those that the user is most likely to want to re-use or re-purpose as part of their own document. In this manner a known source (in this case, known by the user) can be considered a credible source and have a higher likelihood of being a useful and relevant source for documents.

A graph structure may be used to represent relationships between people and things. The graph structure may be implemented in any system with users that can be identified within the system and have the relationships between them identified. For example, a company may have employees that can be identified by unique user identifiers and may further include a company hierarchy where the employees are assigned groups and managers and/or are assigned roles. Another example includes students who may be identified in a school system with unique identifiers and have information that can be used to group students and faculty together such as class schedules, majors, and departments.

Figure 1A:
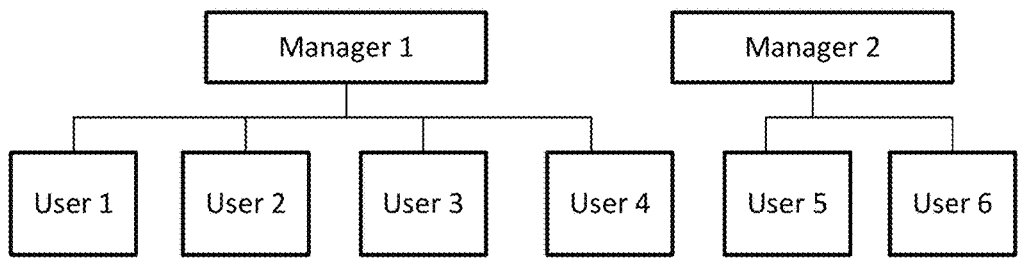
FIGS. 1A and 1B illustrate data structure representing relationships between people.
Figure 1B:
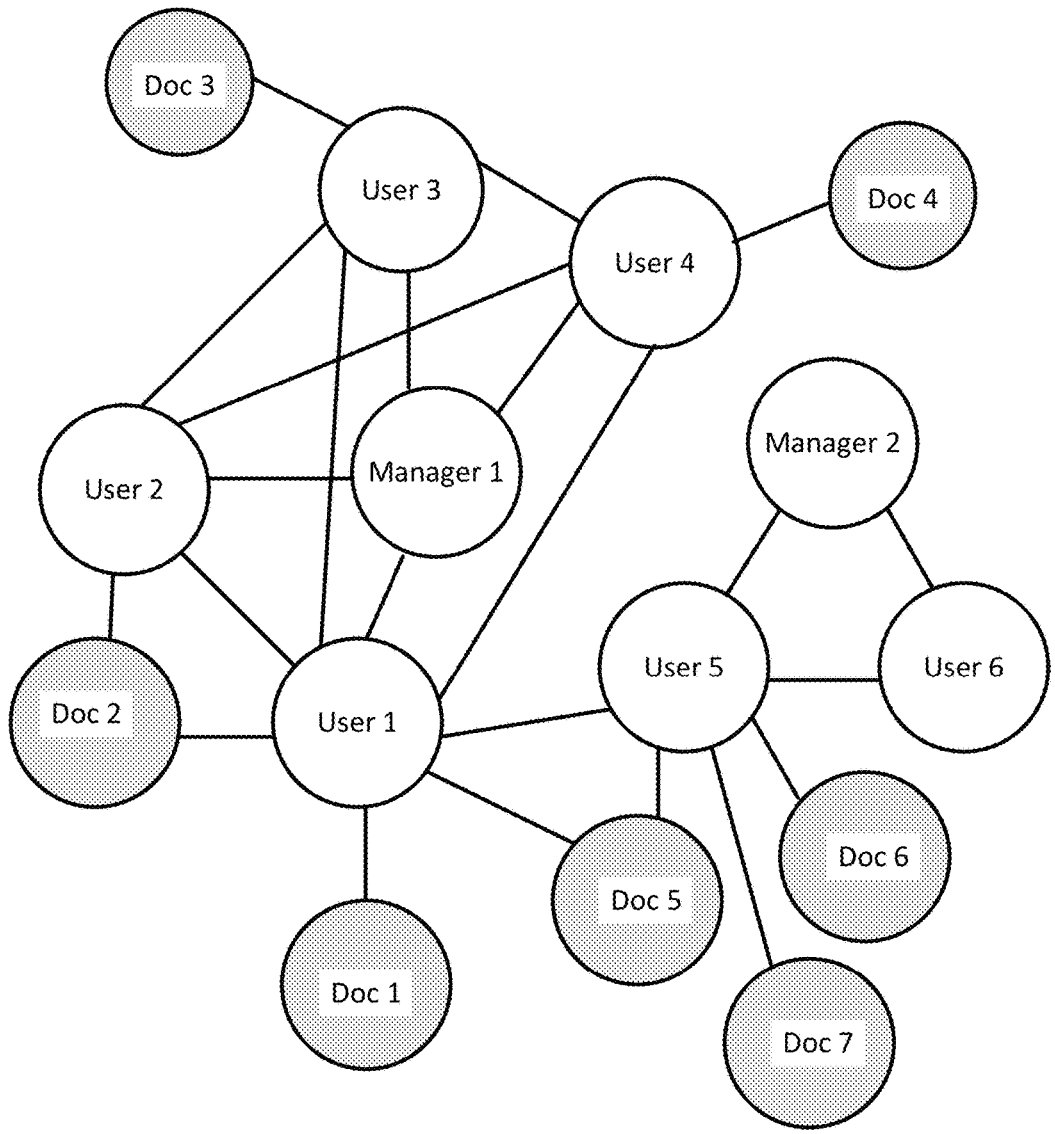

FIGS. 1A and 1B illustrate data structure representing relationships between people; FIG. 1A illustrates an example company hierarchy and FIG. 1B illustrates a representative graph data structure based on the example hierarchy that may be used to drive authoring in productivity tools. Referring to FIG. 1A, a company may have a hierarchy that contains Manager 1 who oversees a group of User 1, User 2, User 3, and User 4; and Manager 2 who oversees a group of User 5 and User 6. As shown in FIG. 1B, a graph structure representing relationships between these people shows a connection between Manager 1 and each of the members of that group, a connection between each of the members of the group, a connection between Manager 2 and each of the members of that group, and a connection between each of the members of that group.

The illustrated graph structure also shows connections between the people and some of the documents that they authored or co-authored. For example, User 1 is shown connected to Doc 1, Doc 2, and Doc 5; User 2 is shown connected to Doc 2, User 3 is connected to Doc 3, User 4 is connected to Doc 4, and User 5 is connected to Doc 5, Doc 6, and Doc 7. Here, the graph shows User 1 connected to User 5 even though these two users are not in the same work group. This connection may have been generated in the graph because User 1 and User 5 co-authored Doc 5. Accordingly, the described graph structure encompasses both documents as well as people. Thus, the graph contains information about the relationships between people and their interactions with documents.

Although the described techniques are specifically described with respect to taking advantage of graph structures, the data may alternatively be stored in other structures. In such alternative embodiments, any suitable mechanism for searching may be used where the data about user relationships, documents associated with those users (by the users creating, modifying, or suitably interacting with those documents), and the dates/times the users created, modified, or suitably interacted with those documents are available.

Figure 2A:
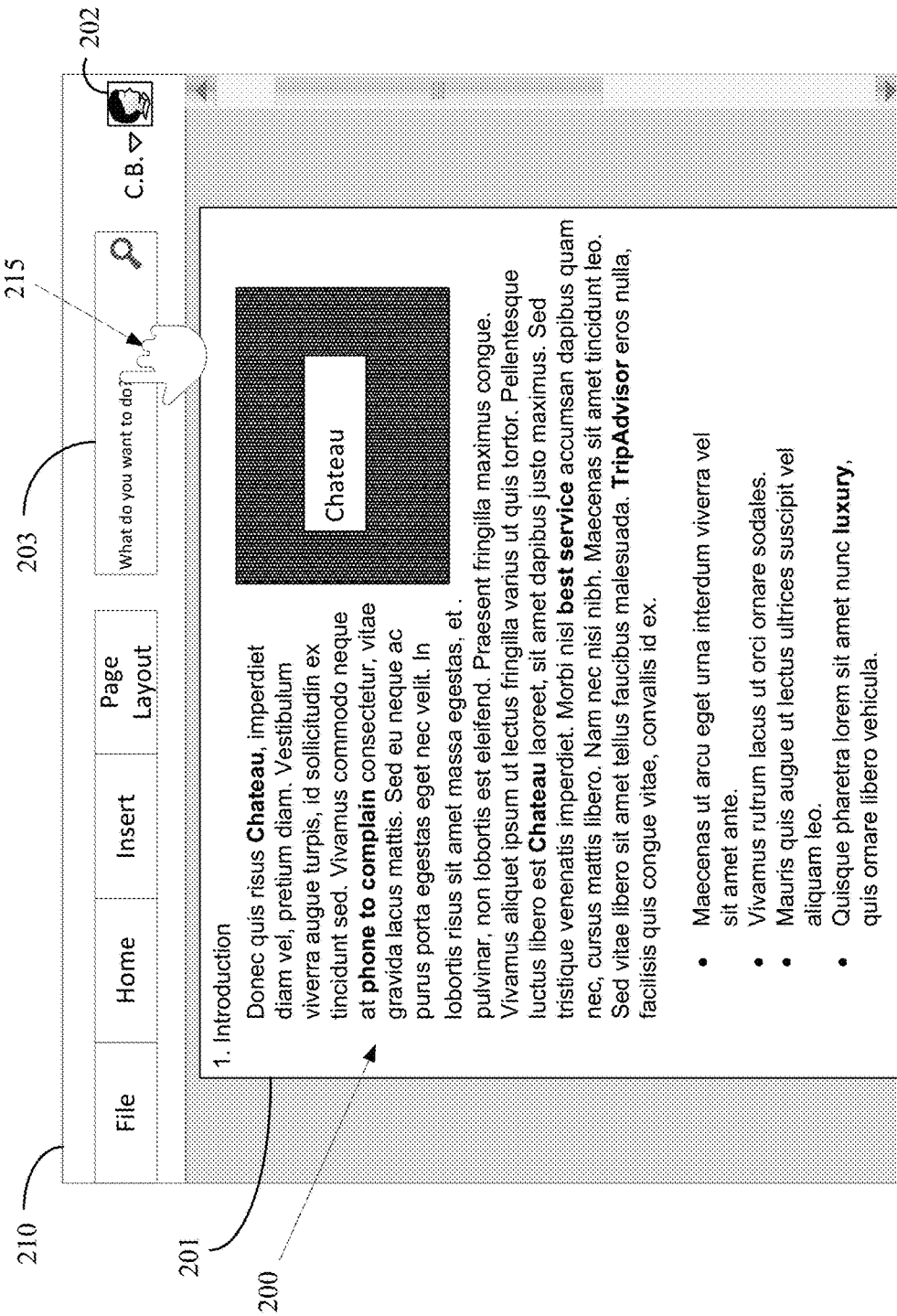
FIGS. 2A-2C illustrate a graphical user interface and corresponding actions taken by a productivity application providing a graph-driven content authoring experience in which the productivity application determines relevant content for use within the productivity application.
Figure 2B:
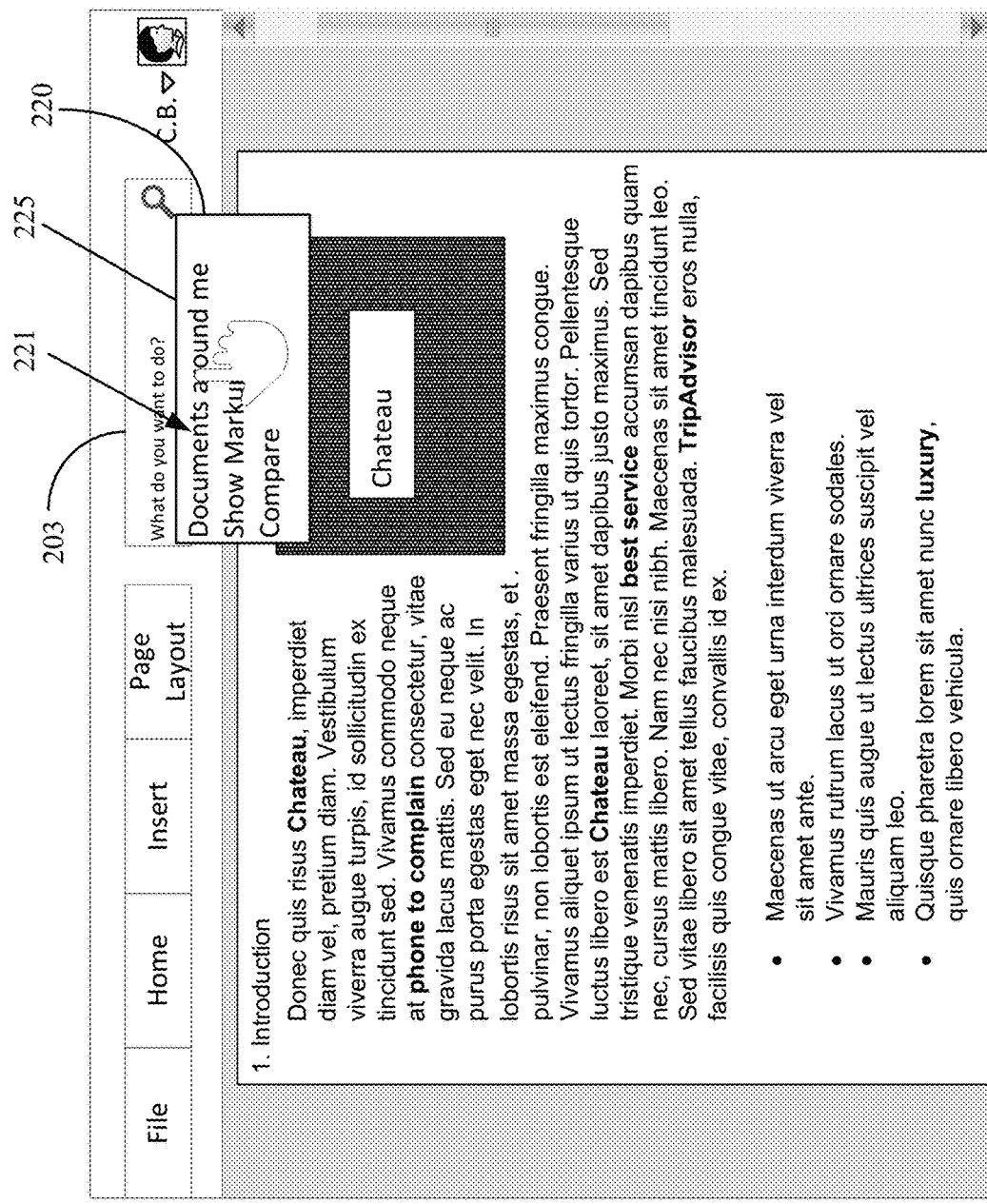
Figure 2C:
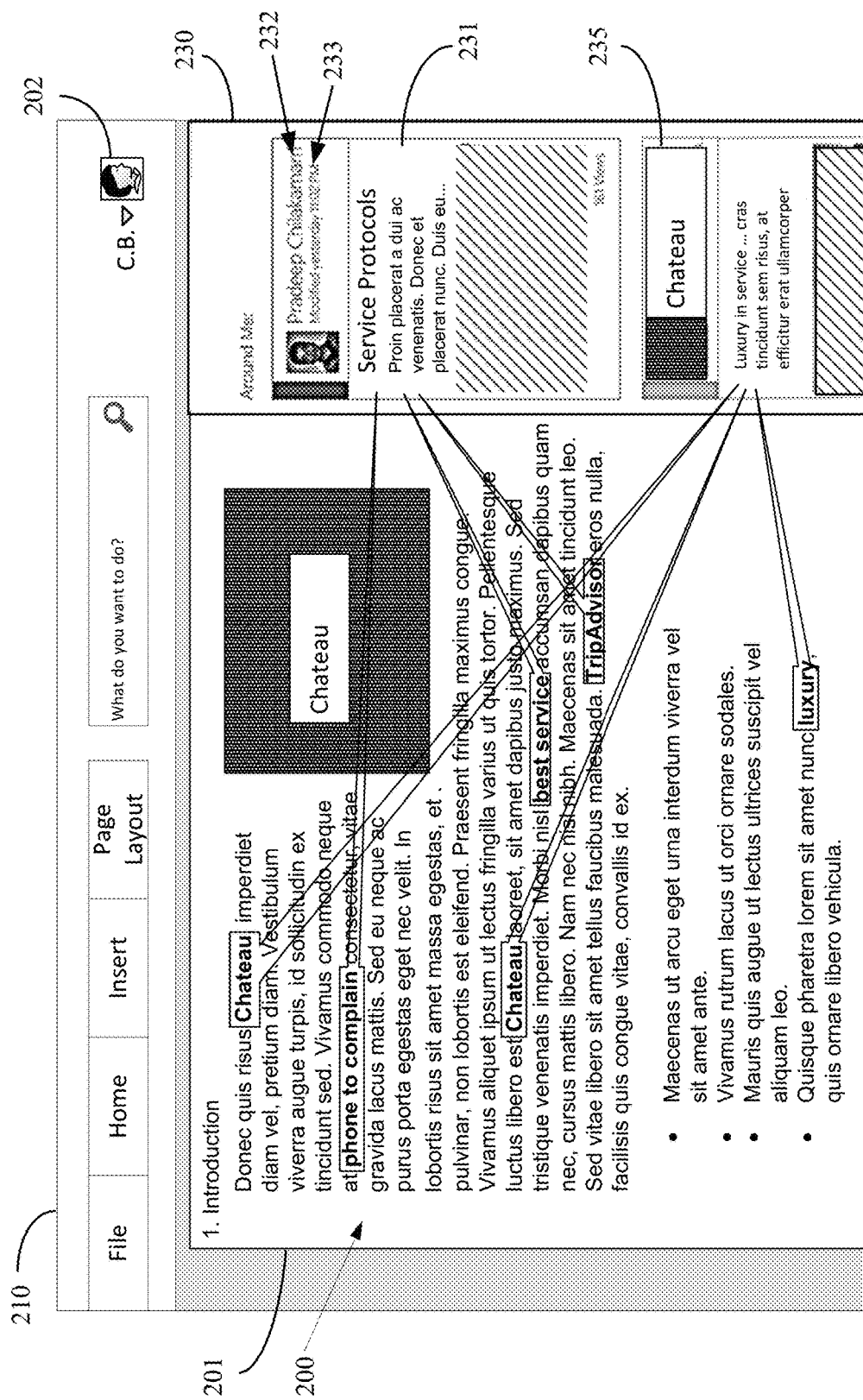

FIGS. 2A-2C illustrate a graphical user interface and corresponding actions taken by a productivity application providing a graph-driven content authoring experience in which the productivity application determines relevant content for use within the productivity application.

Referring to FIG. 2A, a user may have authored content 200 within a document 201. Content 200 may be input to the document 201 from a graphical user interface 210 of a productivity application as well as through input mechanisms available from the productivity application (e.g., copy and paste, input of text via a keyboard, input via a web clipper, and speech recognition as some examples). The graphical user interface 210 can be rendered on a display screen associated with a computing device (which can be a computing system 600 such as described with respect to FIG. 6). In some cases, the display screen may be physically connected to a processing system of the computing device, for example, by cables or by being built into a package containing the processing system of the computing device. In some cases, the display screen may be wirelessly connected to the processing system. In some cases, the display screen is any surface on which the graphical user interface is projected. Such surfaces include a wall, an object surface, a body surface, or even what appears to be in space (e.g., a "hovering display" using a projector and prism or a virtual retinal display).

In the example illustrated in FIG. 2A, the user, C.B. 202 has written something to do with the Chateau company and the service principles that the staff exhibited. According to an implementation, the productivity application can include a search bar 203 as part of the graphical user interface 210 for editing a document (such as document 201).

The search bar 203 can be a simple search bar that accepts text queries, a "smart" search bar that attempts to predict the text being input, and/or further include a drop down menu of options for quick selection. The search bar 203 provides an input field for a user to make a request to the productivity application or express some form of intent for using the productivity application. The search bar 203 can receive the user's expression/request via a typing keyboard, a touch keyboard or display, a motion gesture, a touch gesture, a stylus (e.g., "inking"), head, eye and gaze tracking, brain activity, or voice input. In some cases, the input field can be provided as part of a menu, tool bar, task bar/pane, or other graphical user interface element located on a same or different visual display as a content authoring surface of a productivity application. Although specific implementations are described with respect to graphical user interfaces, it should be understood that natural user interface (NUI) components may be used in addition to or in place of graphical user interface components.

In this example case, if the user indicates that the search bar 203 is being used, for example, by touching (215) the search bar or clicking in the search bar input field, a drop down menu 220 as shown in FIG. 2B may appear. An option for finding relevant documents (named in the example as "documents around me") can be provided.

As shown in FIG. 2B, the drop down menu 220 can include a selection of "documents around me" 221. It should be understood that the use of a drop down menu 220 from a search bar 203 and the text "documents around me" 221 are not intended to be limiting. Indeed, the specific words or icon or entry point for this command may vary depending on implementation. Commands may be initiated by a user via, for example, selection of an icon, voice input, gestural or touch input, and the like. The availability of such a command enables the productivity application to perform certain techniques in response to a user's explicit request.

Figure 3A:
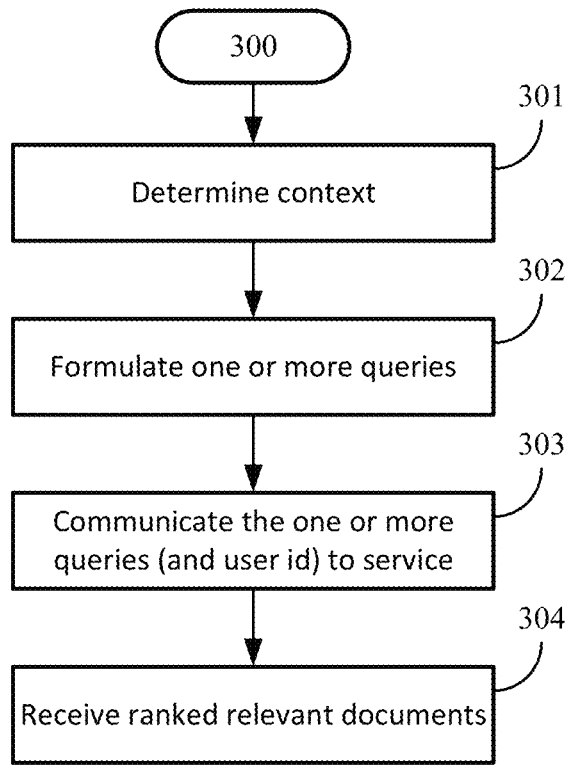
FIGS. 3A and 3B illustrate example processes for finding relevant references for graph-driven authoring in productivity tools.
Figure 3B:
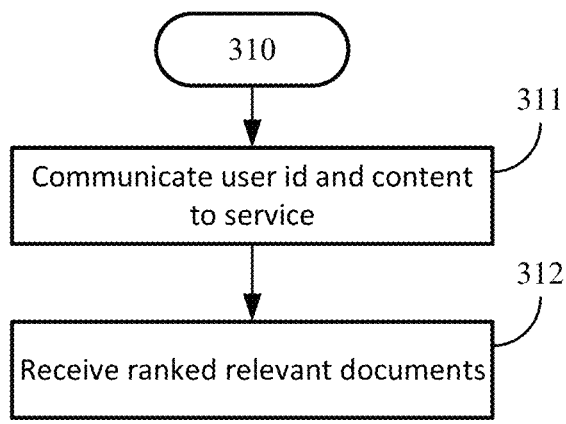

Thus, in response to receiving an indication of a command (through any suitable input) for "documents around me" (e.g., by an indication of a selection 225), the productivity application can perform the process illustrated in FIG. 3A or FIG. 3B and reflected in the graphical user interface illustrated in FIG. 2C.

FIGS. 3A and 3B illustrate example processes for finding relevant references for graph-driven authoring in productivity tools. Referring to FIG. 3A, in response to receiving the indication of a command for relevant documents (300), which in the case illustrated in FIGS. 2A-2C is a request for content that may be relevant to the user's own document's content, the productivity application can generate a request to a service to retrieve relevant documents. In the example process illustrated in FIG. 3A, to generate the request, the productivity application performs extractions of the document to determine context (301); and formulates one or more queries (302). Here, at least the user's information (e.g., user identifier for C.B. 202) and the content 200 of the user's document 201 are used to provide context and refine the query formulated by the productivity application. In some cases, there is no content in the document itself and the productivity application uses the content of an expression entered via a search bar 203 to extract any identifiable entities or topics.

The productivity application then communicates the query (or queries) to a service that can search a graph or other connected data structure for documents relevant to the user (303). After communicating the request, the productivity application receives ranked relevant documents from the service (304).

Alternatively, referring to FIG. 3B, in response to receiving the indication of a command for relevant documents (310), which in the case illustrated in FIGS. 2A-2C is a request for content that may be relevant to the user's own document's content, the productivity application generates a request from the content and information associated with the user's document, and communicates the request containing at least the user's information (e.g., user identifier for C.B. 202) and the content 200 of the user's document 201 and/or an expression entered into the search bar 203 to a service that formulates queries and can search a graph or other connected data structure for documents relevant to the user (311). After generating and communicating the request, the productivity application receives ranked relevant documents from the service (312). Here, the productivity application may simply communicate the user's information 202 and text in the document and/or the search bar to the service so the service performs extractions, query formulations, and graph search. In some of such cases, the service may also return information indicating the extracted entities and topics.

As described with respect to FIG. 1B, a graph involves a searchable data structure that indicates (and connects) to a user the people that have a relationship to that user and the documents with which those people have had interactions (e.g., modified, created, etc.). As an illustration, the user, C.B. 202, may be considered "close" to Pradeep 232 by being close in the company's organization structure (e.g., by being part of a same group and/or have a same manager—see also FIG. 1A) and in their interactions (e.g., by both having worked on same documents, such as in a reviewing capacity or co-authoring—see also User 1 and User 5 in FIG. 1B). Based on these indicators for closeness, it can be expected that there is a relatively high likelihood that a document Pradeep 232 worked on (or interacted with to a certain extent) is relevant to something on which C.B. 202 is working.

To improve the relevancy of the documents returned by the search, a temporal aspect is included. For example, the productivity application can provide timestamp information so that the service can use the date and/or time of the request to search for current content. In this manner, the most current relevant documents can be returned to a user.

The temporal aspect (by providing the timestamp or other mechanism for indicating the date), enables current information from the credible sources to be provided. Current does not require a date within a particular amount of time from that indicated by the timestamp (although that may be the case); rather, the information can be current if it is the most recent version or the document most recently accessed or modified.

In many cases, the ability to identify relevant documents relies on a graph structure where the user can be authenticated and people, documents, and other bits of information with a connection to the user can be identified by traversing the graph. For example, relevant people can be connected to the user in the graph structure based on their relationship determined (with permission) from email communications (e.g., who is a common recipient or sender, who is a contact), from social media connections, and activity on servers.

In a corporate environment, relevant people can be identified from organizational structures and hierarchies (often managed by human resource and/or rights management software). In an academic environment, students may be mapped to majors, classes, etc. and students may be associated with each other based on common subject areas and interests. A combination of hierarchical relationships and message interactions (e.g., people who are senders or recipients of communications with the user) may be used to identify relevant people (or those more closely connected on the graph).

In some cases, the service can identify relevant content without using a graph structure, for example by performing a search at a search engine using the context to refine the search query.

There could also be people who the user does not have any interactions with, but who would have materials useful for the user's document. For example, the user may be putting together a presentation about solving a certain problem. Someone in customer support may have a presentation with some slides that are relevant even though the user does not know person from customer support. However, since the person in customer support belongs to the user's company (e.g., is part of the hierarchy) and the content is found to be relevant to the context of the user's document, the customer support person's presentation may return as part of the results.

Accordingly, the results do not only contain documents authored or edited (or otherwise sufficiently interacted with) by a person closely associated with the user, but also documents that are relevant in other ways (e.g., significant context relevance—and which could be authored or edited by someone in the hierarchical organization to which the user belongs).

It should be noted that in an enterprise, there may be documents that not all users have access to based on their assigned roles (rights management). Projects that may be given limited access in the organization can still be protected from being returned in the results since the user's identifier is part of the query and can be used to authenticate access to certain documents when that user has access rights to those documents or sources.

Returning to FIG. 2C and the graphical user interface 210 at the client, it can be seen that certain terms and phrases may be extracted from the content 200 in the user's document 201 during the step of determining context (301). The terms here are "Chateau", "phone to complain", "best service", "TripAdvisor", and "luxury". These terms and phrases can be identified by the productivity application when determining context (301), for example by the application analyzing documents for key words and using disambiguation to recognize terms and phrases. In some cases, the productivity application can, via any suitable machine learning technique, learn enterprise-specific terminology and acronyms. Of course, in some implementations, the context extraction (and associated techniques) can be carried out by the service instead of by the client. For example, after the productivity application communicates the user id and content to the service (311).

The content (and the structure such as headings) of the document can be analyzed to identify entities, topics, and key phrase extractions. In the example shown in FIG. 2C, "phone to complain" is a key phrase and "TripAdvisor" is an entity.

The extraction of key phrases is trained on the enterprise graph. The system (providing the service) can automatically and in an unsupervised manner train on a corporation specific corpus. A corpus of an enterprise has different specific entities, abbreviations, and concepts (e.g., code or project names) than a publicly available corpus. Therefore, a training system may be provided inside the enterprise firewall to train on documents in an unsupervised fashion to learn to recognize the entities with the appropriate concepts understood and tied to the terms.

The content in the document may contain various entries, such as text, words, strings, numbers, symbols, images and the like. An entry may be recognizable as an entity based on various characteristics.

The analysis of the document can include searching for recognizable entities and/or domains, for example by named entity recognizers and dictionary look-ups. A domain is a category for a series of entities (or items). For example, a domain may be books. An entity refers to a concept (person, organization, location, service, temporal, numeric, monetary etc.) that a document (or other file) is discussing or describing. In the book domain example, they entity may be a specific book. The aspects are the properties or attributes of the entity that are mentioned about the entity and which may be of interest to the user. In the case of a book as an entity, the genre or the premise/plot are examples of the aspects. It should be understood that the term "entity" should not be restricted to specific named entities and may refer to broad concepts such as "sales data" or "pitch deck".

A topic is a distribution of words and that can correspond to an aspect of an entity (and sometimes the entity itself). A topic serves as a subject or category of related information. The topic of an expression can be used for entity disambiguation (e.g., using Latent Dirichlet Allocation (LDA) and its hierarchical variants). Entity disambiguation refers to the identifying of entities from text and their labeling with one of several entity type labels. The text can be referred to as a surface form. An entity can be referred to by multiple surface forms, and a surface form can refer to multiple entities. For example, the entity Michael Jordan may be referred to as "No. 23" and "MJ"; and the surface form "No. 23" may refer to multiple entities such as the two basketball players (Michael Jordan and Lebron James), the number 23, and the movies (23 and The Number 23). In some cases, Wikipedia may be used as a comprehensive reference catalog for large-scale entity disambiguation. In other cases, the enterprise corpus can be used to facilitate the entity disambiguation.

The identified terms and phrases can then be used to formulate the one or more queries communicated with the user information to the service (302, 303), for example using key words, entities and/or topics. The service then returns the results from the various sources it searches within the enterprise and, in some cases, outside the enterprise. The results can be provided in the form of a set of ranked results that identify the relevant documents.

The ranking provided by the system searching the graph for relevant content may involve identifying how close the source of the document is to the user and potentially the amount of content or similarity of the content to the topic of the user's content. Documents authored by people that the user knows (as understood by the system) can be ranked higher than documents authored by people the user does not know.

Identifying, via the service, the people that the user knows in view of the context and the context itself (e.g., "phone to complain", "best service", "TripAdvisor") in view of other documents available within the enterprise results in relevant information being retrieved and presented to the user, for example in an information pane 230 of the productivity application graphical user interface 210. The productivity application may receive a certain number of results or all of the results that fit a particular criteria. In some cases there may be more results received than the graphical user interface 210 is able to show in a space provided by the information pane 230. Additional functionality may be provided to enable scrolling or access to more results than fit on a page when that occurs.

Returning to the illustration in FIG. 2C, a paper 231 written by Pradeep 232, a member of the same group in the organization and a frequent co-author and instant messenger with C.B. 202, is shown as a top result in the information pane 230 within the productivity application graphical user interface 210. This paper may be presented as a high ranked result because of the relationship between C.B. 202 and Pradeep 232 and the relevancy of the content of Pradeep's document 231 to the content 200 of C.B.'s document 201.

The temporal aspect can also be reflected in the information displayed in the information pane, for example by indicating the date of an activity performed with respect to the document. In the illustrated example, the information pane 230 indicates that Pradeep modified the document yesterday 233.

In the optional use of external sources, the illustrated example shows that the terms "Chateau" and "luxury" may have been used to return information from the Chateau's website 235. The result of the external search (e.g., information from website 235) can also be provided to the user, for example in the same pane 230 as the ranked relevant documents from internal sources (e.g., document 231). This scenario can be useful when the user is referencing something outside the company.

For the external search, the user identifier may not be included in the queries that the server conducts because there may not be a source with a relationship to the user. However, in those cases, the query includes the context terms and, optionally, the date/time information so that the results can be ranked not only by content, but also by temporal relationship (e.g., how current the information is).

It should be understood that the graphical user interface for the productivity application (and the information pane) may be implemented in more than one window (but as part of the same instance) and even across more than one device, for example where a user is accessing the document and/or the productivity application using multiple screens or multiple devices. One example of multiple devices can entail a command menu interface on a first device such as a watch or mobile phone (e.g., which displays a search field and/or the information pane) and an authoring surface on a second device such as a tablet or desktop computer (or docked laptop computer) with monitor(s) (e.g., which displays the document).

Figure 4A:
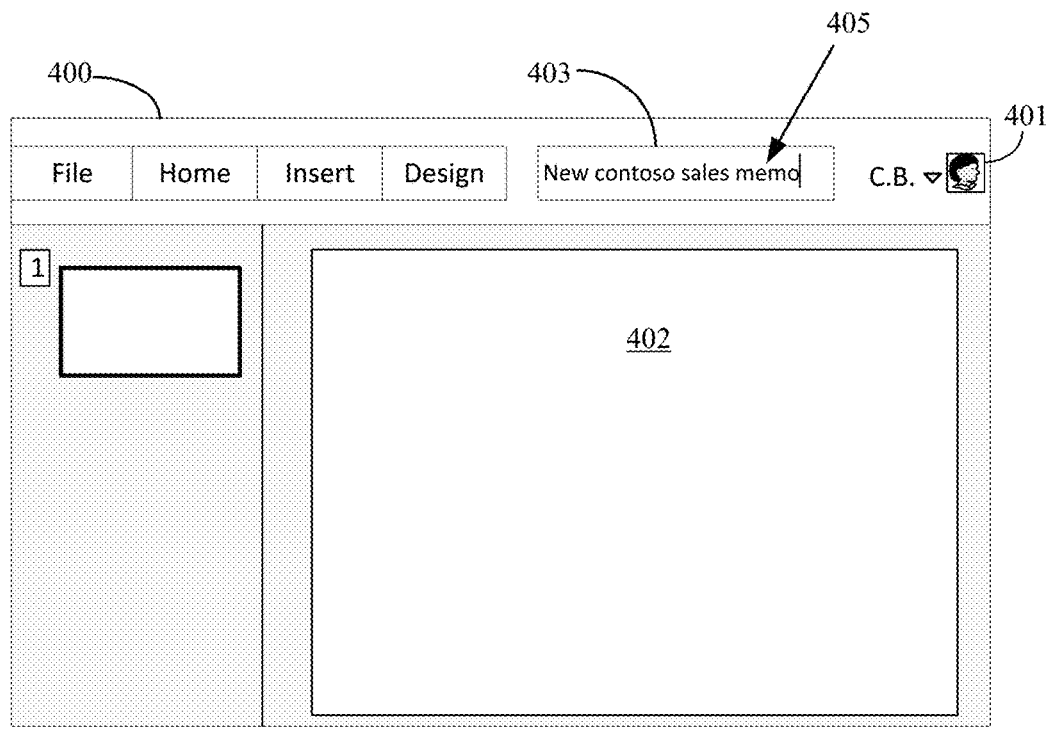
FIGS. 4A-4E illustrate a graphical user interface and corresponding actions taken by a productivity application to provide a graph-driven content authoring experience.

FIGS. 4A-4E illustrate a graphical user interface and corresponding actions taken by a productivity application to provide a graph-driven content authoring experience. Referring to FIG. 4A, in a graphical user interface 400 of a presentation productivity application, an initial state may be a blank or new presentation (e.g., a default state for a "new" document). For this illustrative scenario, the user, C.B. 401, of the presentation productivity application is writing a new Contoso company sales memo on a presentation slide 402. The graphical user interface for the presentation productivity application can include a search bar 403 such as described with respect to the search bar 203 of FIGS. 2A-2C.

In particular, the search bar 403 provides an input field for a user to make a request to the productivity application or express some form of intent for using the productivity application. The search bar 403 can receive the user's expression/request via a typing keyboard, a touch keyboard or display, a motion gesture, a touch gesture, a stylus (e.g., "inking"), head, eye and gaze tracking, brain activity, or voice input. In some cases, the input field can be provided as part of a menu, tool bar, task bar/pane, or other graphical user interface element located on a same or different visual display as a content authoring surface of a productivity application. Although specific implementations are described with respect to graphical user interfaces, it should be understood that natural user interface (NUI) components may be used in addition to or in place of graphical user interface components.

Figure 4B:
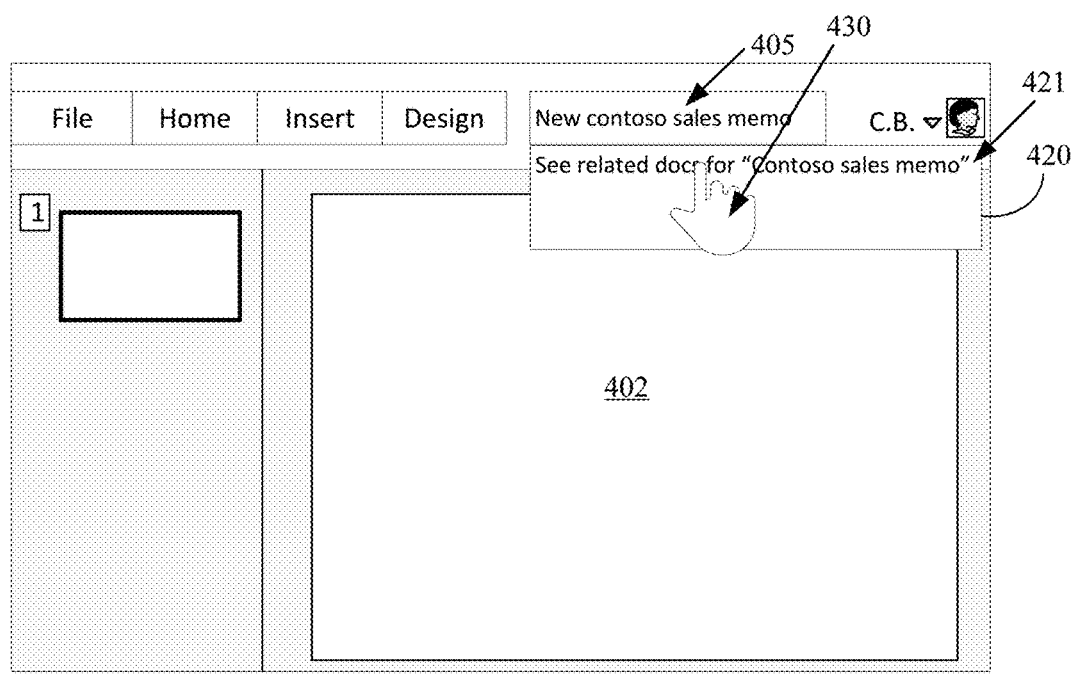

In this example case, the user inputs "New contoso sales memo" 405 in the input field of the search bar 403. The input of such a phrase may be sufficient as a command to obtain relevant documents or a separate command such as via selection of an icon, voice input, gestural or touch input and the like may initiate a process by the productivity application for the graph-driven authoring experience. For example, a drop down menu 420 can provide a number of actions available to the user, including a selection of seeing related documents 421, which may be selected (430) as shown in FIG. 4B in order to initiate a command for the productivity application to perform a process similar to that illustrated in FIG. 3A or 3B. Since there is no content in the presentation document to obtain context, in response to receiving the indication of a command for relevant documents, the terms input to the search bar 403 are used to generate the request to the service. The terms may be directly provided to a service (e.g., as in step 311), which determines context and formulates queries to search a graph or other connected data structure, or the productivity application determines the context (e.g., as in step 301). In either case, terms and phrases are identified from the input through entity and topic disambiguation.

Here, at least the user's information (e.g., user identifier for C.B. 401) and the content, "New contoso sales memo" 405 input to the search bar 403 are used to provide context and refine the query formulated by the productivity application. In some cases where the productivity application determines the context (e.g., as in step 301), the context is provided to the service (and may also include some direct content). In other cases where the productivity application determines the context (e.g., as in step 301), the productivity application formulates the query or queries (e.g., as in step 302) and then communicates the query (or queries) to the service that can search a graph or other connected data structure for documents relevant to the user (303). After the request for documents has been sent to the service, the productivity application receives ranked relevant documents from the service (304, 312).

For example, the productivity application may have determined that the input "New contoso sales memo" 405 is about the company "Contoso" and a sales memo, and such entities/topics (the context) can be communicated to the service to obtain relevant documents from various sources within the enterprise. Date/time information can also be included in order to facilitate the temporal aspect of the results.

In some cases, the productivity application can send the input directly from the user to the service and the service determines one or more topics from the content of the search bar.

Identifying, via the service, the people that the user C.B. 401 knows in view of the context and the context itself (e.g., "Contoso" and "sales memo") in view of other documents available within the enterprise results in relevant information being retrieved and presented to the user, for example in an information pane 440 of the productivity application graphical user interface 400. It should be further understood that the process may be initiated without an explicit user query (e.g., by an expression input to the search box or highlighted from the content in the document). For instance, a user may be able to directly access the information pane 440 while in the middle of their authoring process. The application may then generate a set of relevant results based on the content that is in the document at the time of the user's access of the information pane 440.

Figure 4C:
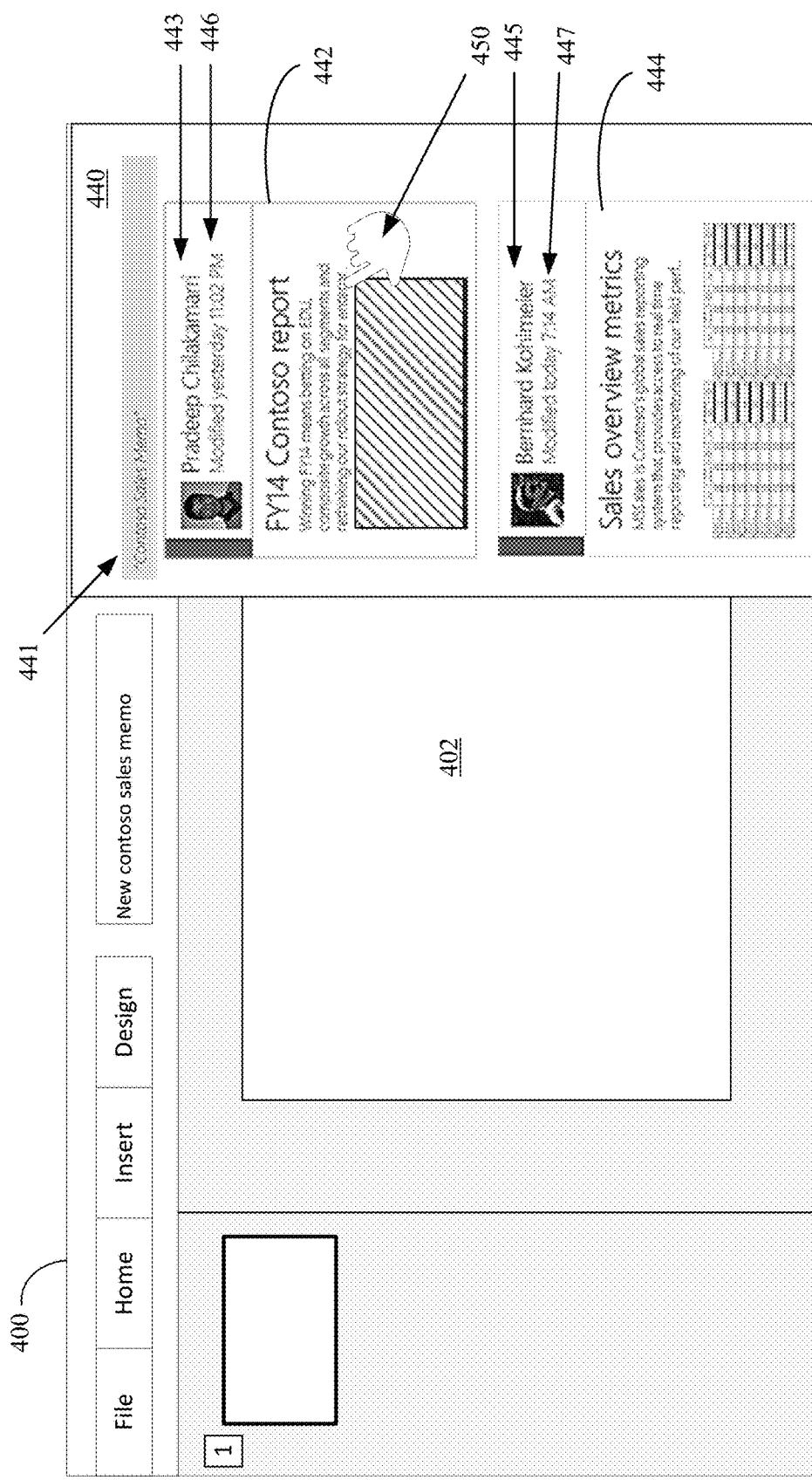

In the example illustrated in FIG. 4C, the information pane 440 indicates the topic 441 for the results and lists the identified ranked results that were returned by the service. Here, two documents are shown, one presentation document 442 from Pradeep 443 and one spread sheet document 444 from Bernhard 445. These results may have been selected by the service based on the relationship of Pradeep and Bernhard to the user C.B. combined with the relevancy of the documents to "Contoso Sales Memo". The temporal aspect is reflected in the indication that the FY14 Contoso Report 442 was modified by Pradeep yesterday 446 and that the Sales overview metrics 444 was modified by Bernhard today 447. It should be understood that the documents of the FY14 Contoso Report 442 and the Sales overview metrics 444 do not necessarily need to be owned by or originally authored by Pradeep or Bernhard, only that they had a sufficient interaction with those documents to indicate a relationship on the graph.

Figure 4D:
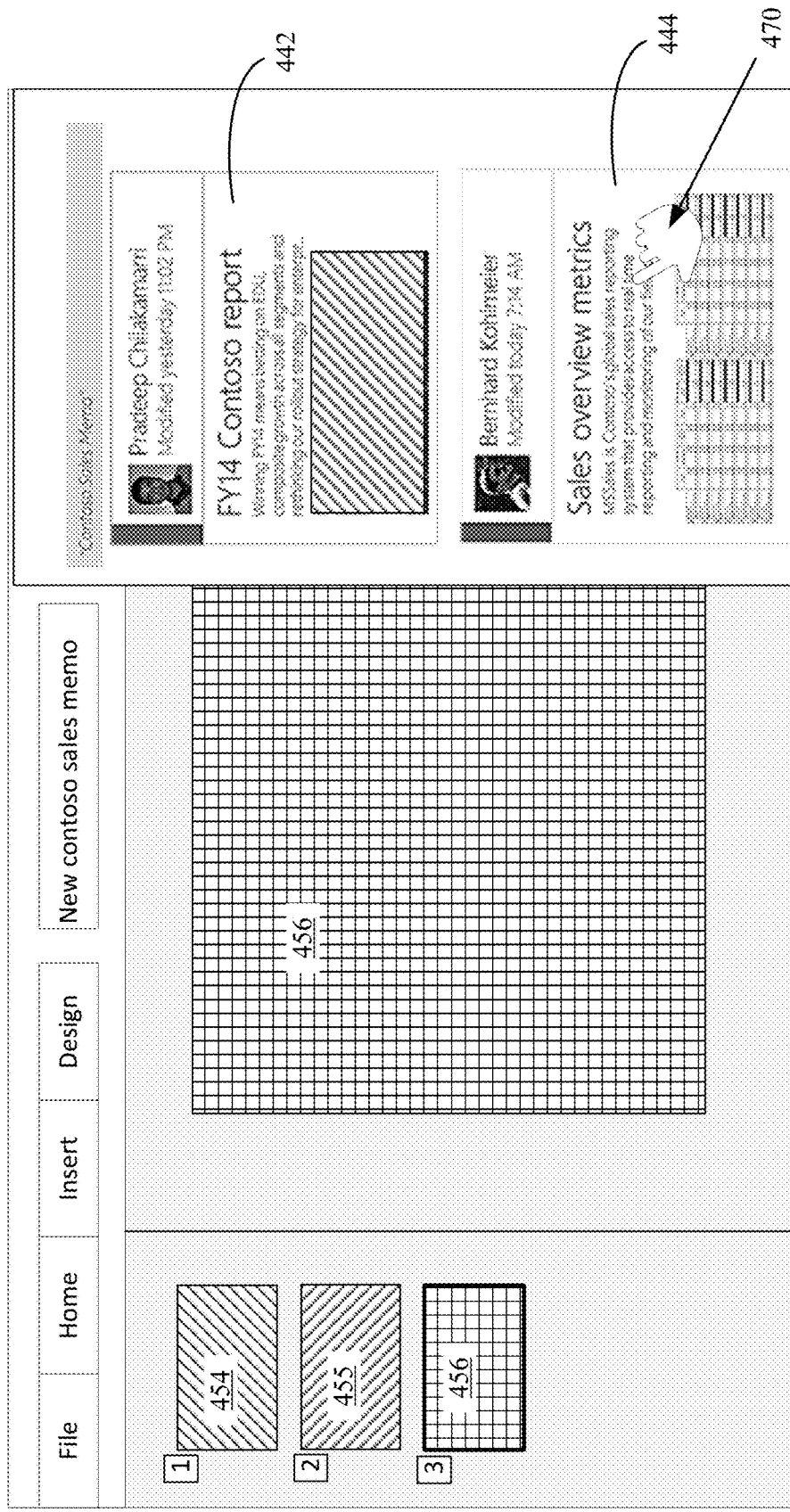
Figure 4E:
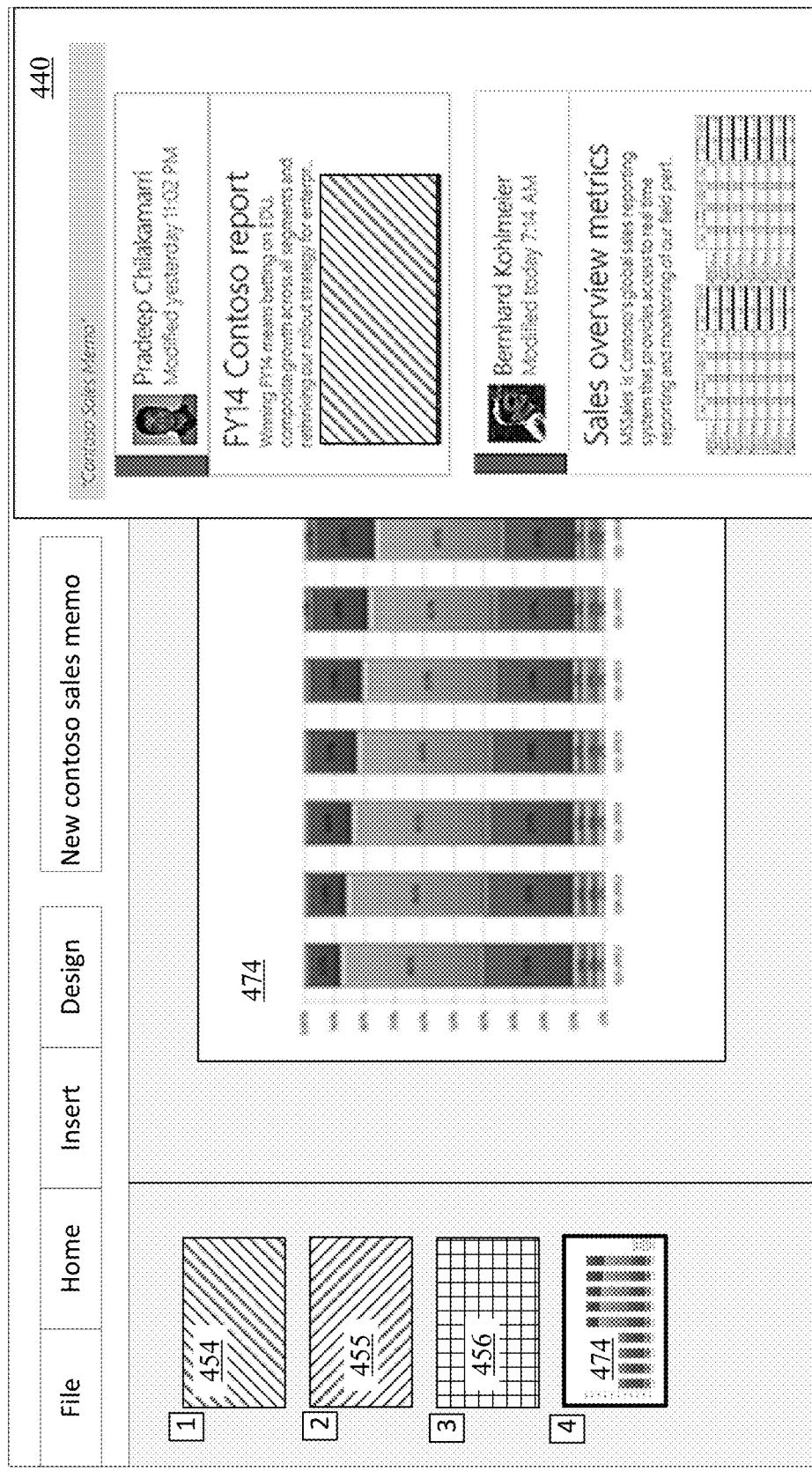

From the information pane 440 of FIG. 4C, the user may select (450) the FY14 Contoso report 442 for insertion of all or some of the content of that slide deck. After inserting selected slides from the FY14 Contoso report 442, for example, slides 454, 455, and 456 from the FY14 Contoso report 442, the user may select (470) the Sales overview metrics 444 for insertion of some or all of the content of that spread sheet as illustrated in FIG. 4D. The user may insert selected charts from the spreadsheet into one or more slides, resulting in slide 474, for example, as illustrated in FIG. 4E.

As shown, the productivity application enables the user to reuse content from a variety of content and application types (file types). A "file type" or "file format type" refers to the different file formats available for encoding information for storage in a computer file. Examples of file types for "documents" include publishing document file formats, word processing document file formats, graphics file formats, presentation document file formats, spreadsheet document file formats, and webpage document file formats.

Figure 5:
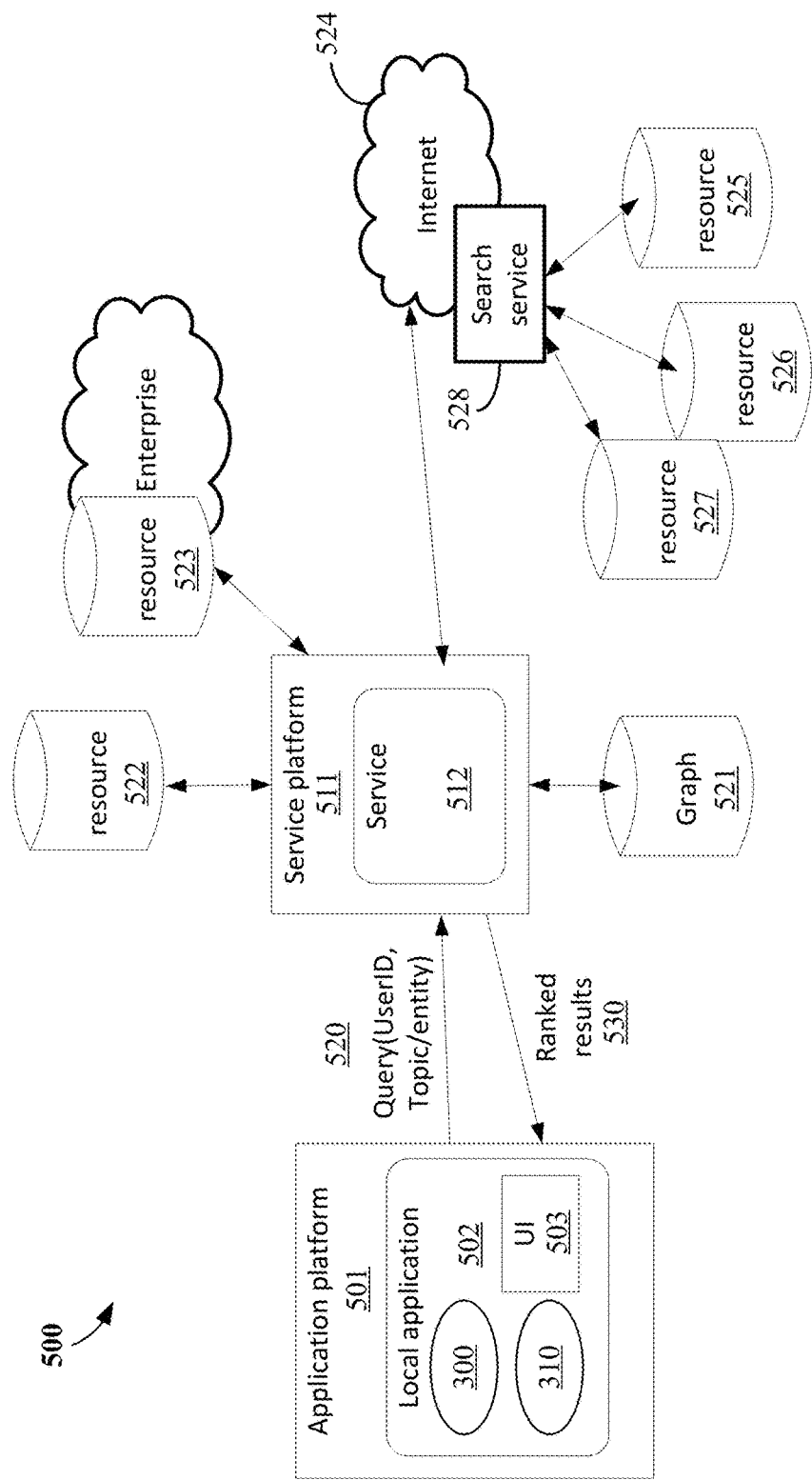
FIG. 5 illustrates an operating environment in which graph-driven authoring for productivity applications may be carried out.

FIG. 5 illustrates an operating environment in which graph-driven authoring for productivity applications may be carried out. Referring to FIG. 5, operating environment 500 may be involve a service architecture with an application platform 501 and a service platform 511. Local application 502 is executed within the context of application platform 501, while service 512 is hosted by and runs within the context of service platform 511.

Local application 502 is representative of any software application, module, component, or collection thereof, capable of implementing a graphical user interface 503 such as graphical user interfaces 210 and 400 (and corresponding productivity applications) and performing processes 300 and 310. Examples of applications in which the described graph-driven authoring techniques may be provided include, but are not limited to, word processing applications, spreadsheet applications, presentation applications, web browsers, email applications, blogging and micro-blogging applications, social networking applications, and gaming applications. Indeed, the described techniques are suitable for a variety of productivity applications.

Examples of productivity applications include the Microsoft Office® suite of applications from Microsoft Corp., including Microsoft Word®, Microsoft Excel®, Microsoft PowerPoint®, as well as the web application components thereof, all registered trademarks of Microsoft Corp.; Google Docs (and Google Drive™); the Apache OpenOffice™ available from the Apache Software Foundation; the LibreOffice® suite of applications available from The Document Foundation, registered trademarks of The Document Foundation; and the Apple iWork® suite of applications from Apple Inc, including Apple Pages®, Apple Keynote®, and Apple Numbers®, all registered trademarks of Apple Inc.

The term "productivity application" may in some cases by synonymous with "content authoring application" or "content authoring tool". Since the described systems and techniques focus on applications and tools through which content is being authored, there is no distinction intended between these terms and such terms may be used interchangeably herein.

Local application 502 may be a browser-based application that executes in the context of a browser application. In some implementations, local application 502 may execute in the context of or in association with a web page, web site, web service, or the like. However, local application 502 may also be a locally installed and executed application, a streamed application, a mobile application, or any combination or variation thereof. Local application 502 may be implemented as a standalone application or may be distributed across multiple applications.

Figure 6:
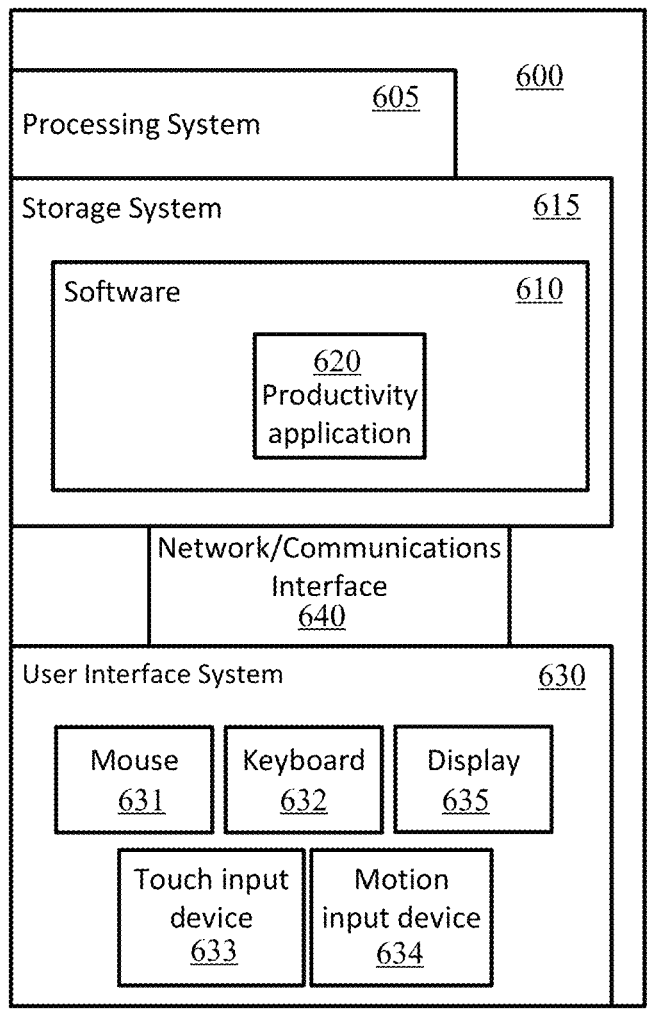
FIG. 6 illustrates components of a computing device that may be used in certain implementations described herein.

Application platform 501 with local application 502 can represent a client computing device with a productivity application providing a graph-driven authoring experience as described herein. Application platform 501 is representative of any physical or virtual computing system, device, or collection thereof capable of hosting local application 502 (and capable of employing processes 300 described with respect to FIG. 3A and processes 310 described with respect to 3B). Examples include, but are not limited to, smart phones, laptop computers, tablet computers, desktop computers, hybrid computers, gaming machines, smart televisions, entertainment devices, Internet appliances, virtual machines, wearable computers (e.g., watch, glasses), as well as any variation or combination thereof, of which computing system 600 illustrated in FIG. 6 is representative.

Service platform 511 with service 512 can represent the service that carries out the queries of a graph on behalf of the productivity application in order to provide relevant documents to the user of the productivity application. For example, the productivity application, executing processes 300, can communicate a query 520 to the service 512 on the service platform 511. The query 520 may be a search query or a graph query.

A document graph storing the information about connected people and documents may be stored in a resource 521 accessible by the service platform 511. In addition service platform 511 can host, be integrated with, or be in communication with enterprise resources 522 (including cloud-based resources 523) such as contacts databases, Active Directory database, file storage, and the like. Example resource include, but are not limited to Microsoft SharePoint, Microsoft OneDrive, and Dropbox. By communication between service platform 511 and application platform 501, Service 512 may also be able to carry out a search of resources local to the application platform 501. In some cases, service platform 511 can further be in communication with Internet resources 524 such as resources 525, 526, and 527 available through a search service 527, containing, for example, web sites, web pages, contacts databases, Active Directory database, lists, maps, accounts, and the like.

Accordingly, service 512 can carry out processes to search the available resources for relevant documents (and in some cases other content) based on the user and the content (having identifiable entity and topic) provided from the productivity application (as well as the date) and provide ranked results 530 to the local application 502. Service 512 may be able to search (with permission) any database that contains content that a user may want to reuse.

Figure 7:
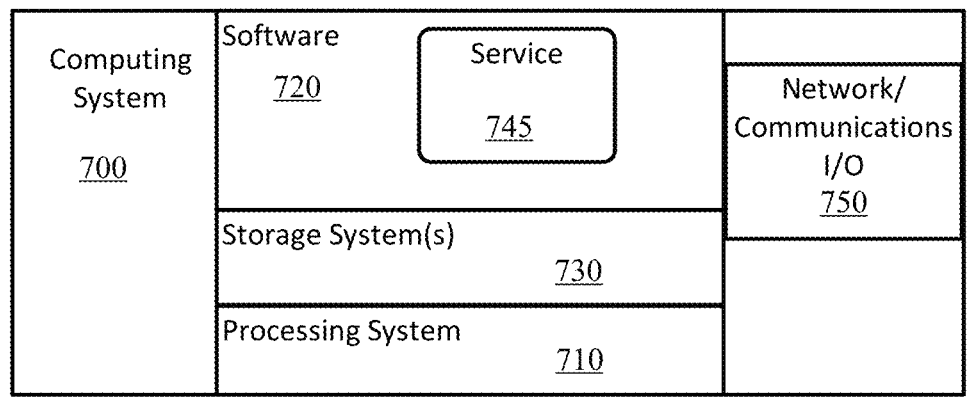
FIG. 7 illustrates components of a computing system that may be used to implement certain methods and services described herein.

Service platform 511 is representative of any physical or virtual computing system, device, or collection thereof capable of hosting all or a portion of service 512. Examples of service platform 511 include, but are not limited to, web servers, application servers, rack servers, blade servers, virtual machine servers, or tower servers, as well as any other type of computing system, of which computing system 700 of FIG. 7 is representative. In some scenarios, service platform 511 may be implemented in a data center, a virtual data center, or some other suitable facility. In some cases, service platform 511 may be implemented similarly to computing system 600.

In some cases, local application 502 may be considered remote from service 512 in that each are implemented on separate computing platforms. In such situations, local application 502 and service 512 may communicate by way of data and information exchanged between application platform 501 and service platform 511 over a suitable communication link or links (not shown). In other cases, the features and functionality provided by local application 502 and service 512 can be co-located or even integrated as a single application.

FIG. 6 illustrates components of a computing device that may be used in certain implementations described herein; and FIG. 7 illustrates components of a computing system that may be used to implement certain methods and services described herein.

Referring to FIG. 6, system 600 may represent a computing device such as, but not limited to, a personal computer, a reader, a mobile device, a personal digital assistant, a wearable computer, a smart phone, a tablet, a laptop computer (notebook or netbook), a gaming device or console, an entertainment device, a hybrid computer, a desktop computer, or a smart television. Accordingly, more or fewer elements described with respect to system 600 may be incorporated to implement a particular computing device.

System 600 includes a processing system 605 of one or more processors to transform or manipulate data according to the instructions of software 610 stored on a storage system 615. Examples of processors of the processing system 605 include general purpose central processing units, application specific processors, and logic devices, as well as any other type of processing device, combinations, or variations thereof. The processing system 605 may be, or is included in, a system-on-chip (SoC) along with one or more other components such as network connectivity components, sensors, video display components.

The software 610 can include an operating system and application programs such as a productivity application 620 providing a graph-driven authoring experience such as described herein. Device operating systems generally control and coordinate the functions of the various components in the computing device, providing an easier way for applications to connect with lower level interfaces like the networking interface. Non-limiting examples of operating systems include Windows® from Microsoft Corp., Apple® iOS™ from Apple, Inc., Android® OS from Google, Inc., and the Ubuntu variety of the Linux OS from Canonical.

It should be noted that the operating system may be implemented both natively on the computing device and on software virtualization layers running atop the native device operating system (OS). Virtualized OS layers, while not depicted in FIG. 6, can be thought of as additional, nested groupings within the operating system space, each containing an OS, application programs, and APIs.

Storage system 615 may comprise any computer readable storage media readable by the processing system 605 and capable of storing software 610 including the productivity application 620.

Storage system 615 may include volatile and nonvolatile, removable and non-removable media implemented in any method or technology for storage of information, such as computer readable instructions, data structures, program modules, or other data. Examples of storage media of storage system 615 include random access memory, read only memory, magnetic disks, optical disks, CDs, DVDs, flash memory, magnetic cassettes, magnetic tape, magnetic disk storage or other magnetic storage devices, or any other suitable storage media. In no case is the storage medium a propagated signal or carrier wave.

Storage system 615 may be implemented as a single storage device but may also be implemented across multiple storage devices or sub-systems co-located or distributed relative to each other. Storage system 615 may include additional elements, such as a controller, capable of communicating with processing system 605.

Software 610 may be implemented in program instructions and among other functions may, when executed by system 600 in general or processing system 605 in particular, direct system 600 or the one or more processors of processing system 605 to operate as described herein.

In general, software may, when loaded into processing system 605 and executed, transform computing system 600 overall from a general-purpose computing system into a special-purpose computing system customized to retrieve and process the information for facilitating content authoring as described herein for each implementation. Indeed, encoding software on storage system 615 may transform the physical structure of storage system 615. The specific transformation of the physical structure may depend on various factors in different implementations of this description. Examples of such factors may include, but are not limited to the technology used to implement the storage media of storage system 615 and whether the computer-storage media are characterized as primary or secondary storage.

The system can further include user interface system 630, which may include input/output (I/O) devices and components that enable communication between a user and the system 600. User interface system 630 can include input devices such as a mouse 631, track pad (not shown), keyboard 632, a touch device 633 for receiving a touch gesture from a user, a motion input device 634 for detecting non-touch gestures and other motions by a user, a microphone for detecting speech (not shown), and other types of input devices and their associated processing elements capable of receiving user input.

The user interface system 630 may also include output devices such as display screen(s) 635, speakers (not shown), haptic devices for tactile feedback (not shown), and other types of output devices. In certain cases, the input and output devices may be combined in a single device, such as a touchscreen display which both depicts images and receives touch gesture input from the user. A touchscreen (which may be associated with or form part of the display) is an input device configured to detect the presence and location of a touch. The touchscreen may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen is incorporated on top of a display as a transparent layer to enable a user to use one or more touches to interact with objects or other information presented on the display.

Visual output may be depicted on the display 635 in myriad ways, presenting graphical user interface elements, text, images, video, notifications, virtual buttons, virtual keyboards, or any other type of information capable of being depicted in visual form.

The user interface system 630 may also include user interface software and associated software (e.g., for graphics chips and input devices) executed by the OS in support of the various user input and output devices. The associated software assists the OS in communicating user interface hardware events to application programs using defined mechanisms. The user interface system 630 including user interface software may support a graphical user interface, a natural user interface, or any other type of user interface. For example, the interfaces for the productivity application and/or the productivity tool for assisted content authoring (and corresponding functionality) described herein may be presented through user interface system 630.

Communications interface 640 may include communications connections and devices that allow for communication with other computing systems over one or more communication networks (not shown). Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface are controlled by the OS, which informs applications of communications events when necessary.

Computing system 600 is generally intended to represent a computing system with which software is deployed and executed in order to implement an application, component, or service for a productivity tool as described herein. In some cases, aspects of computing system 600 may also represent a computing system on which software may be staged and from where software may be distributed, transported, downloaded, or otherwise provided to yet another computing system for deployment and execution, or yet additional distribution.

Certain aspects described herein, such as those carried out at service platform 511 may be performed on a system such as shown in FIG. 7. Referring to FIG. 7, system 700 may be implemented within a single computing device or distributed across multiple computing devices or sub-systems that cooperate in executing program instructions. The system 700 can include one or more blade server devices, standalone server devices, personal computers, routers, hubs, switches, bridges, firewall devices, intrusion detection devices, mainframe computers, network-attached storage devices, and other types of computing devices. The system hardware can be configured according to any suitable computer architectures such as a Symmetric Multi-Processing (SMP) architecture or a Non-Uniform Memory Access (NUMA) architecture.

The system 700 can include a processing system 710, which may include one or more processors and/or other circuitry that retrieves and executes software 720 from storage system 730. Processing system 710 may be implemented within a single processing device but may also be distributed across multiple processing devices or sub-systems that cooperate in executing program instructions.

Storage system(s) 730 can include any computer readable storage media readable by processing system 710 and capable of storing software 720. Storage system 730 may be implemented as a single storage device but may also be implemented across multiple storage devices or sub-systems co-located or distributed relative to each other. Storage system 730 may include additional elements, such as a controller, capable of communicating with processing system 710. Storage system 730 may also include storage devices and/or sub-systems on which data such as entity-related information is stored.

Software 720, including service 745, may be implemented in program instructions and among other functions may, when executed by system 700 in general or processing system 710 in particular, direct the system 700 or processing system 710 to operate as described herein for a service receiving the productivity application's query and generating results.

System 700 may represent any computing system on which software 720 may be staged and from where software 720 may be distributed, transported, downloaded, or otherwise provided to yet another computing system for deployment and execution, or yet additional distribution.

In embodiments where the system 700 includes multiple computing devices, the server can include one or more communications networks that facilitate communication among the computing devices. For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

A communication interface 750 may be included, providing communication connections and devices that allow for communication between system 700 and other computing systems (not shown) over a communication network or collection of networks (not shown) or the air.

Certain techniques set forth herein with respect to graph-driven authoring in productivity tools may be described in the general context of computer-executable instructions, such as program modules, executed by one or more computing devices. Generally, program modules include routines, programs, objects, components, and data structures that perform particular tasks or implement particular abstract data types.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Embodiments may be implemented as a computer process, a computing system, or as an article of manufacture, such as a computer program product or computer-readable medium. Certain methods and processes described herein can be embodied as software, code and/or data, which may be stored on one or more storage media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system and encoding a computer program of instructions for executing a computer process.

Computer-readable media can be any available computer-readable storage media or communication media that can be accessed by the computer system.

Communication media include the media by which a communication signal containing, for example, computer-readable instructions, data structures, program modules, or other data, is transmitted from one system to another system. The communication media can include guided transmission media, such as cables and wires (e.g., fiber optic, coaxial, and the like), and wireless (unguided transmission) media, such as acoustic, electromagnetic, RF, microwave and infrared, that can propagate energy waves. Although described with respect to communication media, carrier waves and other propagating signals that may contain data usable by a computer system are not considered computer-readable "storage media."

By way of example, and not limitation, computer-readable storage media may include volatile and non-volatile, removable and non-removable media implemented in any method or technology for storage of information such as computer-readable instructions, data structures, program modules or other data. Examples of computer-readable storage media include volatile memory such as random access memories (RAM, DRAM, SRAM); non-volatile memory such as flash memory, various read-only-memories (ROM, PROM, EPROM, EEPROM), phase change memory, magnetic and ferromagnetic/ferroelectric memories (MRAM, FeRAM), and magnetic and optical storage devices (hard drives, magnetic tape, CDs, DVDs). As used herein, in no case does the term "storage media" consist of carrier waves or propagating signals.

Certain aspects of the invention provide the following non-limiting embodiments:

Example 1

A system comprising: a processing system; a storage system comprising one or more computer readable storage media; a display; and a productivity application stored on the storage system that when executed by the processing system directs the processing system to: generate a request for reusable content, the request comprising a user identifier of a user of the productivity application and at least one identifiable entity; communicate the request to a service; and receive a set of ranked results identifying documents comprising at least one relevant document having an associated related user identifier of a related user having a connection to the user of the productivity application, wherein content of the documents are relevant to the at least one identifiable entity.

Example 2

The system of example 1, wherein the documents identified in the set of ranked results comprise documents of at least two file types.

Example 3

The system of example 2, wherein the at least two file types comprise two or more of a word processing document format type, a spread sheet document format type, and a presentation document format type.

Example 4

The system of example 2 or 3, wherein the at least two file types comprise at least a file format for the productivity application.

Example 5

The system of any of examples 1-4, wherein the documents are current based on a timestamp associated with the request.

Example 6

The system of example 5, wherein the timestamp is communicated with the request to the service.

Example 7

The system of any of examples 1-6, wherein the productivity application further directs the processing system to identify the at least one identifiable entity by analyzing content in an expression received via a search bar of a graphical user interface of the productivity application.

Example 8

The system of any of examples 1-7, wherein the productivity application further directs the processing system to identify the at least one identifiable entity by analyzing content in a document of the user of the productivity application.

Example 9

A method for graph-driven authoring in productivity applications, the method comprising: communicating a request for reusable content to a service, the request comprising a user identifier of a user of a productivity application, content having at least one identifiable entity, and a timestamp; and receiving a set of ranked results identifying documents comprising at least one relevant document having an associated related user identifier of a related user having a connection to the user of the productivity application, wherein content of the documents including the at least one relevant document are relevant to the at least one identifiable entity, and wherein the documents are current based on the timestamp.

Example 10

The method of example 9, further comprising identifying the at least one identifiable entity by analyzing content in an expression received via a search bar of a graphical user interface of the productivity application.

Example 11

The method of example 9 or 10, further comprising identifying the at least one identifiable entity by analyzing content in the document of the user.

Example 12

The method of any of examples 9-11, wherein the documents identified in the set of ranked results comprise documents of at least two file types.

Example 13

The method of example 12, wherein the at least two file types comprise two or more of a word processing document format type, a spread sheet document format type, and a presentation document format type.

Example 14

The method of any of examples 9-13, further comprising: receiving the content having the at least one identifiable entity via a search bar of the productivity application.

Example 15

One or more computer readable storage media having instructions stored thereon that when executed by a processing system, direct the processing system to: display a graphical user interface for a productivity application; in response to receiving, via the graphical user interface, a command for finding relevant documents, generate and communicate a request for reusable content to a service, the request comprising a user identifier of a user of the productivity application and at least one identifiable entity; and in response to receiving ranked results identifying relevant documents for the reusable content, display a representation of one or more of the relevant documents in an information pane of the graphical user interface, wherein at least one of the relevant documents has an associated related user identifier of a related user having a connection to the user of the productivity application.

Example 16

The media of example 15, wherein the relevant documents comprise documents of at least two file types.

Example 17

The media of example 16, wherein the at least two file types comprise two or more of a word processing document format type, a spread sheet document format type, and a presentation document format type.

Example 18

The media of any of examples 15-17, wherein the instructions to generate and communicate the request for reusable content to the service comprise instructions that direct the processing system to: extract content from a document opened with the productivity application to provide the at least one identifiable entity with the request; wherein the relevant documents are received from the service and comprise documents having user identifiers associated therewith that correspond to people having connections to the user of the productivity application and content therein that are relevant to at least one entity, at least one topic, or both from the content from the document.

Example 19

The media any of examples 15-18, wherein the instructions to generate and communicate the request for reusable content to the service comprise instructions that direct the processing system to: extract content from an expression received via a search bar of the graphical user interface; wherein the relevant documents are received from the service and comprise documents having user identifiers associated therewith that correspond to people having connections to the user of the productivity application and content therein that are relevant to at least one entity, at least one topic, or both from the expression received via the search bar.

Example 20

The media of example 19, further comprising instructions that direct the processing system to identify the at least one identifiable entity by analyzing content in the expression received via the search bar of the graphical user interface of the productivity application.

It should be understood that the examples and embodiments described herein are for illustrative purposes only and that various modifications or changes in light thereof will be suggested to persons skilled in the art and are to be included within the spirit and purview of this application.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A system comprising:
   a processing system;
   a storage system comprising one or more computer readable storage media;
   a display; and
   a content authoring application stored on the storage system that when executed by the processing system directs the processing system to:
      generate a request for reusable content, the request comprising a user identifier of a user of the content authoring application and at least one identifiable entity;
      communicate the request to a service managing a data structure indicating connections between users and connections between the users and content the users interact with, wherein the connections between the users and the content the users interact with comprise connections from interactions comprising one or more of modifying and creating;
      receive a set of ranked results identifying documents comprising at least one relevant document having an associated related user identifier of a related user having a connection to the user of the content authoring application, wherein content of the documents are relevant to the at least one identifiable entity, and wherein the set of ranked results are ranked based on interactions between the related user and the at least one relevant document, the interactions between the related user and the at least one relevant document comprising one or more of modifying and creating;
      receive a selection to insert all or some of a received relevant document into an authoring canvas of the content authoring application for a second document;
      insert the selection into the second document displayed in the authoring canvas of the content authoring application;
      receive, while the second document is displayed, an interaction by the user with content in the content authoring application; and
      send an indication of the interaction by the user with the content authoring application to the service.

2. The system of claim 1, wherein the documents identified in the set of ranked results comprise documents of at least two file types.

3. The system of claim 2, wherein the at least two file types comprise two or more of a word processing document format type, a spread sheet document format type, and a presentation document format type.

4. The system of claim 2, wherein the at least two file types comprise at least a file format for the content authoring application.

5. The system of claim 1, wherein the documents are current based on a timestamp associated with the request.

6. The system of claim 5, wherein the timestamp is communicated with the request to the service.

7. The system of claim 1, wherein the content authoring application further directs the processing system to identify the at least one identifiable entity by analyzing content in an expression received via a search bar of a graphical user interface of the content authoring application.

8. The system of claim 1, wherein the content authoring application further directs the processing system to identify the at least one identifiable entity by analyzing content in a document of the user of the content authoring application.

9. A method for graph-driven authoring in content authoring applications, the method comprising:
   communicating a request for reusable content to a service managing a data structure indicating connections between users and connections between the users and content the users interact with, the request comprising a user identifier of a user of a content authoring application, content having at least one identifiable entity, and a timestamp, wherein the connections between the users and the content the users interact with comprise connections from interactions comprising one or more of modifying and creating; and
   receiving a set of ranked results identifying documents comprising at least one relevant document having an associated related user identifier of a related user having a connection to the user of the content authoring application, wherein content of the documents including the at least one relevant document are relevant to the at least one identifiable entity, wherein the documents are current based on the timestamp, and wherein the set of ranked results are ranked based on interactions between the related user and the at least one relevant document, the interactions between the related user and the at least one relevant document comprising one or more of modifying and creating;
   receiving a selection to insert all or some of a received relevant document into an authoring canvas of the content authoring application for a second document;
   inserting the selection into the second document displayed in the authoring canvas of the content authoring application;
   receiving, while the second document is displayed, an interaction by the user with content in the content authoring application; and
   sending an indication of the interaction by the user with the content authoring application to the service.

10. The method of claim 9, further comprising identifying the at least one identifiable entity by analyzing content in an expression received via a search bar of a graphical user interface of the content authoring application.

11. The method of claim 9, further comprising identifying the at least one identifiable entity by analyzing content in the second document.

12. The method of claim 9, wherein the documents identified in the set of ranked results comprise documents of at least two file types.

13. The method of claim 12, wherein the at least two file types comprise two or more of a word processing document format type, a spread sheet document format type, and a presentation document format type.

14. The method of claim 9, further comprising:
receiving the content having the at least one identifiable entity via a search bar of the content authoring application.

15. One or more computer readable storage media having instructions stored thereon that when executed by a processing system, direct the processing system to:
display a graphical user interface for a content authoring application;
in response to receiving, via the graphical user interface, a command for finding relevant documents, generate and communicate a request for reusable content to a service managing a data structure indicating connections between users and connections between the users and content the users interact with, the request comprising a user identifier of a user of the content authoring application and at least one identifiable entity, wherein the connections between the users and the content the users interact with comprise connections from interactions comprising one or more of modifying and creating; and
in response to receiving ranked results identifying relevant documents for the reusable content, display a representation of one or more of the relevant documents in an information pane of the graphical user interface, wherein at least one of the relevant documents has an associated related user identifier of a related user having a connection to the user of the content authoring application, and wherein the ranked results are ranked based on interactions between the related user and the at least one of the relevant documents, the interactions between the related user and the at least one of the relevant documents being one or more of modifying and creating;
receive a selection to insert all or some of a received relevant document into an authoring canvas of the content authoring application for a second document;
insert the selection into the second document displayed in the authoring canvas of the content authoring application;
receive, while the second document is displayed, an interaction by the user with content in the content authoring application; and
send an indication of the interaction by the user with the content authoring application to the service.

16. The media of claim 15, wherein the relevant documents comprise documents of at least two file types.

17. The media of claim 16, wherein the at least two file types comprise two or more of a word processing document format type, a spread sheet document format type, and a presentation document format type.

18. The media of claim 15, wherein the instructions to generate and communicate the request for reusable content to the service comprise instructions that direct the processing system to:
extract content from a document opened with the content authoring application to provide the at least one identifiable entity with the request;
wherein the relevant documents are received from the service and comprise documents having user identifiers associated therewith that correspond to people having connections to the user of the content authoring application and content therein that are relevant to at least one entity, at least one topic, or both from the content from the document.

19. The media of claim 15, wherein the instructions to generate and communicate the request for reusable content to the service comprise instructions that direct the processing system to:
extract content from an expression received via a search bar of the graphical user interface;
wherein the relevant documents are received from the service and comprise documents having user identifiers associated therewith that correspond to people having connections to the user of the content authoring application and content therein that are relevant to at least one entity, at least one topic, or both from the expression received via the search bar.

20. The media of claim 19, further comprising instructions that direct the processing system to identify the at least one identifiable entity by analyzing content in the expression received via the search bar of the graphical user interface of the content authoring application.

* * * * *